(12) United States Patent
Tiner et al.

(10) Patent No.: US 11,964,914 B2
(45) Date of Patent: Apr. 23, 2024

(54) INDUSTRIAL SOLID WASTE BASED CONSTRUCTION AND TECHNICAL CERAMICS

(71) Applicant: SERAMIC MATERIALS LIMITED, Abu Dhabi (AE)

(72) Inventors: Mike James Tiner, Austin, TX (US); Nicolas Lopez Ferber, St. Martin de Valgalgues (FR)

(73) Assignee: SERAMIC MATERIALS LIMITED, Abu Dhabi (AE)

( * ) Notice: Subject to any disclaimer, the term of this patent is extended or adjusted under 35 U.S.C. 154(b) by 342 days.

(21) Appl. No.: 17/130,252

(22) Filed: Dec. 22, 2020

(65) Prior Publication Data

US 2021/0198151 A1    Jul. 1, 2021

Related U.S. Application Data

(60) Provisional application No. 62/955,813, filed on Dec. 31, 2019.

(51) Int. Cl.
| | | |
|---|---|---|
| *C04B 33/135* | (2006.01) | |
| *C04B 33/13* | (2006.01) | |
| *C04B 33/132* | (2006.01) | |

(52) U.S. Cl.
CPC ........ *C04B 33/1357* (2013.01); *C04B 33/131* (2013.01); *C04B 33/1324* (2013.01); *C04B 2235/6021* (2013.01); *C04B 2235/606* (2013.01)

(58) Field of Classification Search
CPC ............................................. C04B 33/132–138
See application file for complete search history.

(56) References Cited

U.S. PATENT DOCUMENTS

| | | | | |
|---|---|---|---|---|
| 4,120,735 A | * | 10/1978 | Smith ................... | C04B 35/632 |
| | | | | 106/DIG. 1 |
| 5,268,131 A | * | 12/1993 | Harrison ............... | C04B 18/027 |
| | | | | 264/DIG. 39 |
| 6,342,461 B1 | * | 1/2002 | Lee ...................... | C04B 33/1327 |
| | | | | 501/141 |

(Continued)

FOREIGN PATENT DOCUMENTS

| | | |
|---|---|---|
| CN | 104 891 961 B | 11/2017 |
| JP | H11-199311 A | 7/1999 |

(Continued)

OTHER PUBLICATIONS

Ferber et al. Development of a Thermal Energy Storage Pressed Plate Ceramic Based on Municipal Waste Incinerator Bottom Ash and Waste Clay. Waste and Biomass Valorization (Mar. 2, 2019) 11:689-699. (Year: 2019).*

(Continued)

*Primary Examiner* — Erin Snelting
(74) *Attorney, Agent, or Firm* — Oblon, McClelland, Maier & Neustadt, L.L.P.

(57) ABSTRACT

A ceramic for construction or technical applications, composed of at least one of Municipal Solid Waste Incinerator Bottom Ash (MSWIBA) and other recycled industrial solid waste and different methods of forming such ceramics. Various techniques illustrate how ceramics are formed using at least one of extrusion shaping, dry powder compaction and agglomeration, any of which can be preceded by a pre-treatment process of received feedstock.

18 Claims, 4 Drawing Sheets

*Extrusion shaping process.*

(56) References Cited

U.S. PATENT DOCUMENTS

| | | | | |
|---|---|---|---|---|
| 6,440,884 B1 * | 8/2002 | Devagnanam | ...... | C04B 33/1321 |
| | | | | 501/141 |
| 2006/0213397 A1 * | 9/2006 | Bethani | ............... | C04B 35/6261 |
| | | | | 501/141 |

FOREIGN PATENT DOCUMENTS

| | | | | |
|---|---|---|---|---|
| WO | WO-2006074945 A2 * | 7/2006 | ........... | C04B 18/023 |
| WO | WO 2014/157983 A1 | 10/2014 | | |
| WO | WO 2016/011668 A1 | 1/2016 | | |
| WO | WO-2016051053 A1 * | 4/2016 | ......... | C04B 33/1352 |

OTHER PUBLICATIONS

Written Opinion of the International Searching Authority dated Mar. 23, 2021, issued in PCT Application No. PCT/US2020/67352.
Extended European Search Report dated Jan. 24, 2024, in European Patent Application No. 20908642.0.

\* cited by examiner

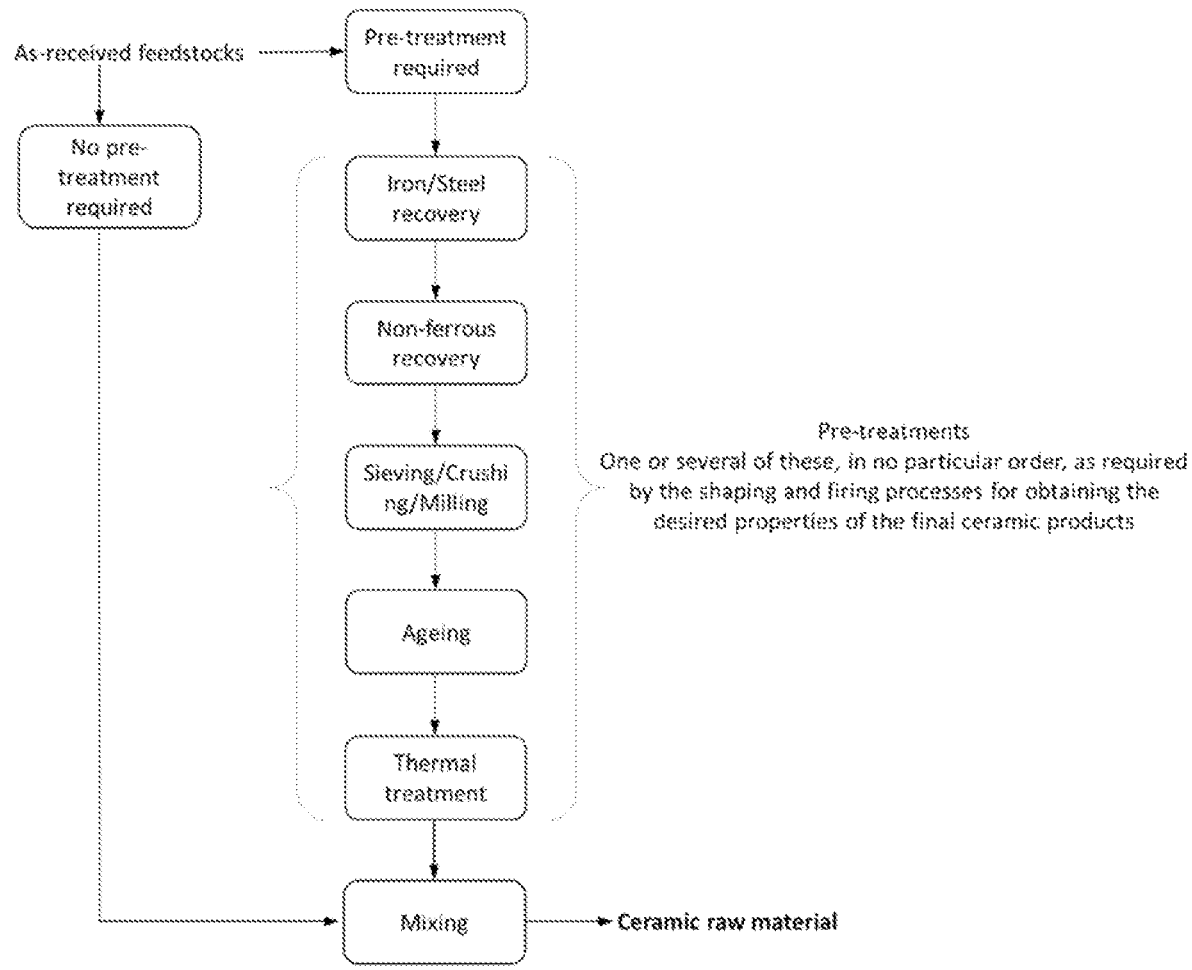
*Fig. 1: Pre-treatments of the as-received feedstocks*

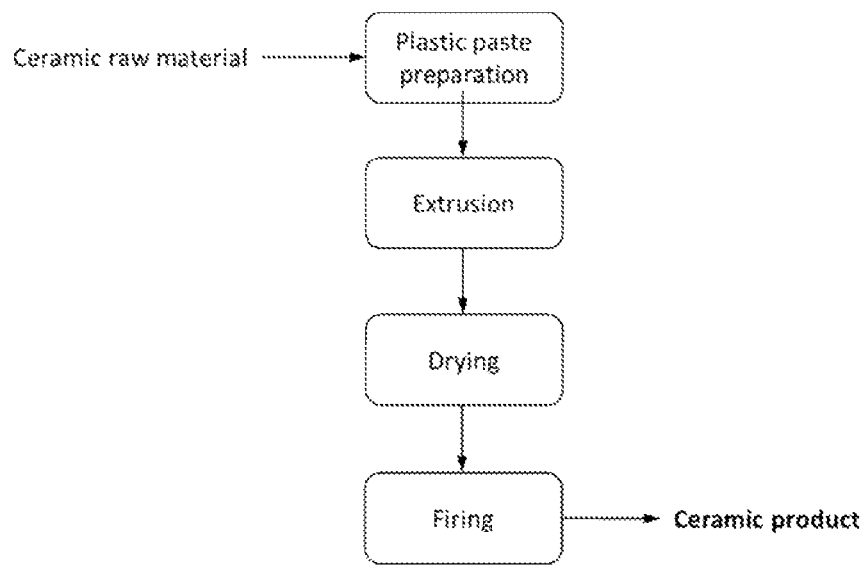
*Fig. 2: Extrusion shaping process.*

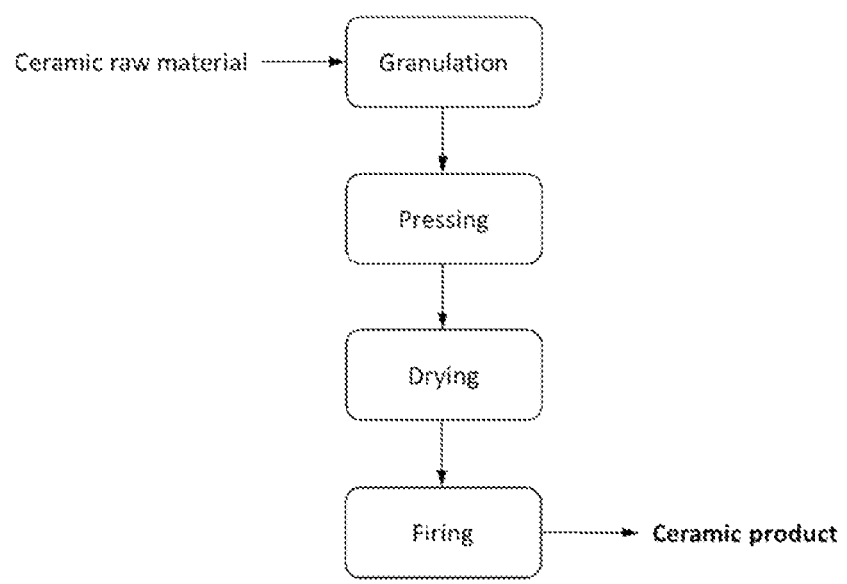
*Fig. 3*: Dry powder compaction shaping process.

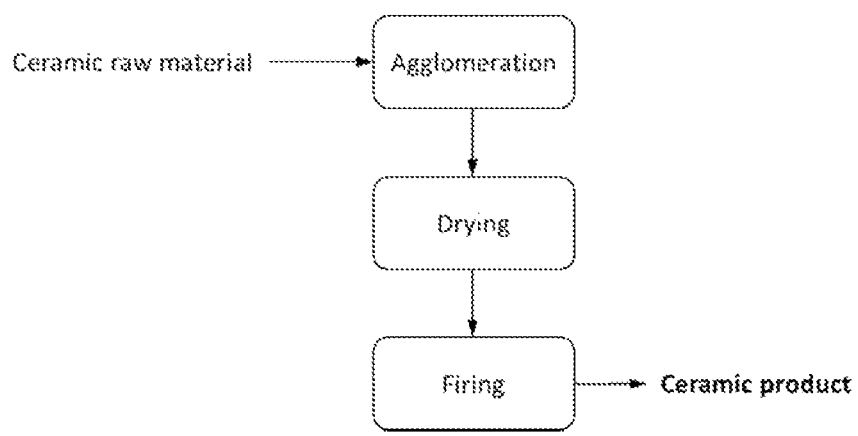
*Fig. 4*: Agglomeration shaping process.

INDUSTRIAL SOLID WASTE BASED CONSTRUCTION AND TECHNICAL CERAMICS

FIELD

The present disclosure is directed to a ceramic for construction or technical applications, composed of at least one of Municipal Solid Waste Incinerator Bottom Ash (MSWIBA) and other recycled industrial solid waste and different methods of forming such ceramics, and in various techniques described herein, the ceramics are formed using at least one of extrusion shaping, dry powder compaction and agglomeration, any of which can be preceded by a pre-treatment process of received feedstock.

BACKGROUND OF THE INVENTION

Due to their immense production volumes in the hundreds of millions tons per year, industrial mineral solid wastes are a growing concern, as most of them are currently landfilled or stockpiled on-site, potentially causing environmental and sanitary problems, and using useful land. Moreover, handling these enormous volumes of wastes increases overall production costs. These wastes include, but are not limited to: iron and steel slags, alumina and aluminum red muds and dross, quarrying mining and ceramic wastes and residues, combustion ashes (biomass or fossil fuels such as coal), and ashes from municipal waste incineration.

As most of these wastes streams are composed of alumina silicates, they might be advantageously recovered, treated and reused as feedstocks for the production of ceramic materials (Patent No. WO2007/126215A1, 2007; Patent No. US006342461B1, 2002; Patent No. US005521132A, 1996), with the added benefits of (i) saving conventional resources such as clay, (ii) saving the environmental potential impacts of ceramic feedstock extraction (iii) potentially decreasing the operational costs of such ceramics production compared to conventional products, (iv) decreasing the need for landfilling installations.

Efforts have been made in the Research and Development community to develop ceramic formulations introducing these industrial wastes into conventional or innovative processes. However, most of these efforts did not make it to industrialization. The authors would like to expand on these works to propose an industrially sound and viable way to mass-produce waste-based ceramics.

More particularly, focusing on Municipal Solid Waste Incinerator (MSWI) ashes seems of primary concern, as more and more countries develop their industrial capacities for household waste incineration, as an alternative to landfilling. Hence, a rapid increase in MSWI ashes is bound to happen.

Generally, MSWI ashes are either used as a road sub-base filler after treatment of the raw ashes (Ahmed & Khalid, 2011; Toraldo, Saponaro, Careghini, & Mariani, 2013), used as aggregates in concrete products (Patent No. US007780781B2, 2010: Patent No. WO2006/074944A1, 2006; Patent No. EP2813479A1, 2014) or as feedstock in cement and concrete (Patent No. EP2288582B1, 2008) or landfilled. Extensive research work since the 2000's proved that ceramic valorization is technically feasible, using a variety of production methods (controlled cooling from molten state, sinter-crystallization, powder sintering), using either MSWI ashes alone (Patent No. WO03/059820A1, 2003), or mixed with various other materials, in various proportions.

BRIEF DESCRIPTION OF DRAWINGS

FIG. 1 is flowchart showing a number of repeatable pre-treatment steps that may be applied to feed stocks prior to a number of the processing steps described herein.

FIG. 2 is a flowchart showing an extrusion technique for creating a ceramic product.

FIG. 3 is a flowchart sliming a compaction technique for creating a ceramic product.

FIG. 4 is a flowchart showing an agglomeration technique for creating a ceramic product.

DETAILED DESCRIPTION OF THE INVENTION

Methods described herein are directed to construction and technical ceramics and methods of forming such ceramics from at least one of Municipal Solid Waste Incinerator Bottom Ash (MSWIBA) and other recycled industrial solid waste. Methods described herein further relate to forming final products by: (i) extrusion, (ii) dry powder compaction process, and (iii) agglomeration. The final products may be used in different fields, depending on their thermal and/or mechanical properties, "Construction ceramic" is a general term describing materials that are typically used in the building, industries, e.g., roof tiles, floor tiles, road tiles, pavement, building bricks (plain or hollow), and claddings. "Technical ceramic" is a general term describing materials optimized for technical applications. Technical ceramics are characterized by specific properties such as thermal resistance, mechanical stability, and dimensional stability. These technical ceramics may be used for, e.g., mechanical tools, thermal or electrical insulants, and refractory materials.

All materials that will not be destroyed during the firing step and will therefore be constituents of the final ceramic product will be thereafter designated as "feedstocks," which exclude organic and water-based additives. Preferably, feedstocks are industrial solid wastes or by-products, or mixtures of them. There are numerous types of feedstocks recoverable from industrial processes, e.g., municipal waste sorting and incineration, iron and steel industry, alumina and aluminum industry, biomass combustion, asbestos inertization, quarrying and mining, recycling industry, and ceramic industry.

In a first embodiment, construction and technical ceramics are produced, wherein MSWIBA comprises about 30% to about 90% of the mixture weight, wherein Unfired Raw Ceramic Materials (URCM) comprises about 10% to about 70% of the mixture weight, wherein MSWIFA comprises about 0% to about 60% of the mixture weight, wherein Glass Waste comprises about 0% to about 60% of the mixture weight, wherein Steelmaking dusts comprise about 0% to about 60% of the mixture weight, wherein Alumina Red Mud comprises about 0% to about 60% of the mixture weight, wherein Aluminum Dross comprises about 0% to about 60% of the mixture weight, wherein Biomass Ash comprises about 0% to about 60% of the mixture weight, wherein Asbestos-containing Waste comprises about 0% to about 60% of the mixture weight, wherein Rock Dust comprises about 0% to about 60% of the mixture weight, wherein Sand comprises about 0% to about 60% of the mixture weight, wherein Fired Ceramic Materials comprises about 0% to about 60% of the mixture weight. In an alternate embodiment, Alumina Red Mud, Aluminum Dross, Biomass Ash, Asbestos-containing Waste, and Rock Dust are used as a fourth feedstock in the range of about 0% to 45% of the mixture weight.

Preferentially, ceramic formulations contain some weight percent of MSWIBA. Municipal waste incineration is a waste treatment that involves the organic substances contained in municipal waste combustion. By high-temperature waste treatment, the incinerator converts the waste into ash, flue gas and heat. The ash is formed by inorganic constituents and may take the form of solid lumps (Municipal Solid Waste Incinerator Bottom Ash: MSWIBA) or particles carried by the flue as (Municipal Solid Waste Incinerator fly Ash: MSWIFA). The MSWIBA may include:
- aluminum oxide ($Al_2O_3$): from 1 to 25 wt. %,
- calcium oxide (CaO): from 3 to 60 wt. %,
- iron oxide ($Fe_2O_3$): from 1 to 20 wt. %,
- magnesium oxide (MgO): from 0.1 to 5 wt. %,
- silicon dioxide ($SiO_2$): from 3 to 65 wt. %,
- sodium oxide ($Na_2O$): from 1 to 25 wt. %,
- potassium oxide ($K_2O$): from 0.5 to 10 wt. %,
- optionally one or More of the following: from 0.01 to 20 wt. %.
- MnO, $P_2O_5$, SOx, Cl, and $TiO_2$ and inevitable impurities, wherein the wt. % is the weight percent relative to the total weight of the MSWIBA composition to provide, including the inevitable impurities, 100 wt. %. The inevitable impurities are, generally, unavoidable and are often a result of the process environment, feedstocks, or the process equipment. Inevitable impurities may be present from 0.01 to 20.0 wt. % of the composition.

Preferentially, the ceramic feedstock will contain some weight percent of clay or a clay-like material. Clay is a finely-grained natural rock/soil material combining one or more clay minerals (hydrous aluminum phyllosilicates), often in combination with quartz and metal oxides, in variable proportions from one deposit to another (especially including clay-like minerals such as bauxite). They are usually plastic when hydrated, and become hard, brittle and non-plastic when dried or fired. Depending on the engineering field, clay-containing materials can also be called silts or muds as a function of particle size. Clay is one of the favorite ceramic industry's feedstocks, due to its good workability when wet. The clay-like material used will be preferentially sourced from discarded material in the ceramic industry (dusts, washing muds, surplus clay) or the mining and quarrying industries (dusts and washing muds). Due to their waste nature, the muds and sludges can contain not only clay, but also ceramic fragments, glaze, sand and other impurities. The clay and clay-like material are designated as Unfired Raw Ceramic Material (URCM). Clays may include:
- aluminum oxide ($Al_2O_3$): from 12 to 71 wt. %,
- calcium oxide (CaO): from 0 to 10 wt. %,
- iron oxide ($Fe_2O_3$): from 1 to 15 wt. %,
- magnesium oxide (MgO): from 0.01 to 10 wt. %,
- silicon dioxide ($SiO_2$): from 6 to 71 wt. %,
- sodium oxide ($Na_2O$): from 0.01 to 3 wt. %,
- potassium oxide ($K_2O$): from 0.01 to 10 wt. %,
- optionally one or more of the following: from 0.01 to 20 wt. %.
- MnO, $P_2O_5$, SOx, and $TiO_2$ and inevitable impurities, wherein the wt. % is the weight percent relative to the total weight of the clay mineral composition to provide, inhaling the inevitable impurities, 100 wt. %. The inevitable impurities are, generally, unavoidable and are often a result of the process environment, feedstocks, or the natural deposit properties. Inevitable impurities may be present from 0.01 to 20.0 wt. %, of the composition.

Preferentially, the ceramic feedstock will contain a small weight percent of the minority raw materials. The minority materials are industrial wastes recoverable from municipal waste incineration (excluding MSWIBA), iron and steel industry, alumina and aluminum industry, biomass combustion, asbestos inertization, quarrying and mining, and ceramic industry (excluding URCM).

When using municipal solid waste incineration, the second waste generated is the MSWIFA in others words, the particles carried by the flue gas. MSWIFA composition can vary, depending on inlet garbage composition, process operations, and if the MSWIFA is mixed together with Air Pollution Control residues. The MSWIFA may include:
- aluminum oxide ($Al_2O_3$): from 0.01 to 13 wt. %,
- calcium oxide (CaO): from 19 to 47 wt. %,
- iron oxide ($Fe_2O_3$): from 0.5 to 6 wt. %,
- magnesium oxide (MgO): from 1 to 5 wt. %,
- silicon dioxide ($SiO_2$): from 4 to 28 wt. %,
- sodium oxide ($Na_2O$): from 1 to 10 wt. %,
- potassium oxide ($K_2O$): from 2 to 9 wt. %,
- Sulfates (SOx): from 4 to 15 wt. %
- Chlorine and chlorates (Cl): from 0.5 to 25 wt. %
- optionally one or more of the following: from 0.01 to 10 wt. %.
- MnO, $P_2O_5$, and $TiO_2$ and inevitable impurities, wherein the wt. % is the weight percent relative to the total weight of the MSWIFA composition to provide, including the inevitable impurities, 100 wt. %. The inevitable impurities are, generally, unavoidable and are often a result of the process environment, feedstocks, or the process equipment. Inevitable impurities may be present from 0.01 to 10.0 wt. % of the composition.

Waste glass, also known as glass collet is mostly produced by the household waste sorting. Waste glass is recycled in glass primary production industry (container glass), although its introduction is limited. Sometimes, it is used as a fluxing agent in the ceramic industry. Their composition can vary depending an the glass type soda-lime or boronsilicate. These materials may include:
- aluminum oxide ($Al_2O_3$): from 0.1 to 4 wt. %,
- calcium oxide (CaO): from 4 to 10 wt. %,
- magnesium oxide (MgO): from 1 to 7 wt. %,
- silicon dioxide ($SiO_2$): from 65 to 80 wt. %,
- sodium oxide ($Na_2O$): from 10 to 20 wt. %,
- potassium oxide ($K_2O$): from 0.5 to 6 wt. %,
- optionally one or more of the following: from 0.01 to 5 wt. %.
- $Fe_2O_3$, MnO, and $K_2O$ and inevitable impurities, wherein the wt. % is the weight percent relative to the total weight of the glass waste composition to provide, including the inevitable impurities, 100 wt. %. The inevitable impurities are, generally, unavoidable and are often at result of the process environment or feedstocks. Inevitable impurities may be present from 0.01 to 5.0 wt. % of the composition.

The steelmaking process is divided into two main stages: production of primary steel, then secondary refilling of the steel in order to obtain the desired steel grade. There are two modern techniques for primary steelmaking: blast furnace (BF) process and electric arc furnace (EAF) process. During the steelmaking process, dust will be released, either mechanically due to the gas flow in the furnace or chemically due to volatilization, which are generally collected in a fumes treatment system. The dusts consist mainly of iron oxides, manganese oxide, silicates and line. It will also contain other metals originating from incoming materials, e.g., Cr, Ni, Pb, Zn, etc. The composition of the dust may vary considerably depending on the steel making process, the use of scrap as a feedstock (EAF process), and the forming substances added into the melt. These dusts are generally named after the process generating them (as an example, an Electric Are Furnace generates EAF dusts). Special steels typically refer to Inox, vanadium-enriched, refractory steels (high Nickel content). Such alloys are produced by using special ores in processes similar to the EAF and Blast furnaces. The most known are Ferrochrome, Ferromanganese, Silicomanganese. Those processes also generate dusts. Also during the steelmaking process, steel slag will be produced. The slags are extracted from steel-making process to be crushed in order to recover valuable iron content using a magnet by third party in annex building of the steel factory. The recovering process produces and collects steel slag dusts as ultimate production waste. The dusts generated in these processes can also be considered as steelmaking wastes. All the aforementioned wastes are here-inafter referred to as "Steelmaking dusts".

Alumina red mud (ARM) or bauxite residue is the by-product of alumina production with the Bayer process. It consists in a fine clay-like powder, mixed with into a strongly alkaline solution (Sodium Hydroxide) to form a mud. Its composition can vary, depending on the composition of the Bauxite deposit processed. The alumina industry usually filter-presses the ARM to recover the alkali solution and reuse it in the Bayer process. ARM is usually stored on-site in mud ponds and dams. ARM may include:
  aluminum oxide ($Al_2O_3$): from 10 to 30 wt. %,
  calcium oxide (CaO): from 0.5 to 45 wt. %,
  iron oxide ($Fe_2O_3$): from 3 to 60 wt. %,
  silicon dioxide ($SiO_2$): from 3 to 56 wt. %,
  sodium oxide ($Na_2O$): from 2 to 10 wt. %,
  potassium oxide ($K_2O$): from 0.01 to 4 wt. %,
  optionally one or more of the following: from 0.01 to 20 wt. %.
  MgO, MnO, $P_2O_5$, SOx, and $TiO_2$
and inevitable impurities, wherein the wt. % is the weight percent relative to the total weight of the ARM composition to provide, including the inevitable impurities, 100 wt. %. The inevitable impurities are, generally, unavoidable and are often a result of the process environment, feedstocks, or the natural deposit properties. Inevitable impurities may be present from 0.01 to 20.0 wt. % of the composition.

There are two types of aluminum smelting (i) primary, and (ii) secondary. The primary aluminum is produced by electrolysis from alumina dissolved in cryolite (Hall Heroult process). On the other hand, the secondary aluminum comes from recycling aluminum-bearing scrap, which is recovered from some items and pans at the end of their useful life. The co-product obtained from primary smelting operations is called white dross. The dross from the secondary smelling operations is called black dross. Their composition can vary depending on the purity of the aluminum input, process operations and the use of slag-forming components added into furnace to help separate aluminum from impurities. The dross may include:
  aluminum oxide ($Al_2O_3$): from 60 to 70 wt. %,
  calcium oxide (CaO): from 0.01 to 5 wt. %,
  iron oxide ($Fe_2O_3$): from 0.01 to 5 wt. %,
  magnesium oxide (MgO): from 0.01 to 7 wt. %,
  silicon dioxide ($SiO_2$): from 0.5 to 10 wt. %,
  sodium oxide ($Na_2O$): from 0.01 to 9 wt. %,
  potassium oxide ($K_2O$): from 0.01 to 4 wt. %,
  optionally one or more of the following: from 0.01 to 20 wt. 5.
  MnO, $P_2O_5$, SOx, and $TiO_2$
and inevitable impurities, wherein the wt. % is the weight percent relative to the total weight of the dross composition to provide, including the inevitable impurities, 100 wt. %. The inevitable impurities are, generally, unavoidable and are often a result of the process environment or feedstocks, inevitable impurities may be present from 0.01 to 20.0 wt. % of the composition.

Biomass combustion residues consists in Biomass Bottom Ash (BBA) and Biomass Fly Ash (BFA). Their composition can vary widely depending of the biomass' nature, process operations and eventual secondary feedstocks used as fuel (plastics, papers, etc.). The ashes (bottom ash and fly ash) may include:
  aluminum oxide ($Al_2O_3$): from 0.01 to 10 wt. %,
  calcium oxide (CaO): from 0.01 to 70 wt. %,
  iron oxide ($Fe_2O_3$): from 0.01 to 4 wt. %,
  magnesium oxide (MgO): from 0.01 to 12 wt. %,
  silicon dioxide ($SiO_2$): from 3 to 95 wt. %,
  potassium oxide ($K_2O$): from 0.01 to 48 wt. %,
  phosphorous oxide ($P_2O_5$): from 0.01 to 22 wt. %,
  optionally one or more of the following: from 0.01 to 10 wt. %.
  MnO, SOx, and $TiO_2$
and inevitable impurities, wherein the wt. % is the weight percent relative to the total weight of the biomass combustion residues composition to provide, including the inevitable impurities, 100 wt. %. The inevitable impurities are, generally, unavoidable and are often a result of the process environment or feedstocks. Inevitable impurities may be present from 0.01 to 10.0 wt. % of the composition.

Asbestos has been widely used as an industrial insulant. However, the crystallographic structure of this material is highly hazardous, as it consists in micrometric fibers that can penetrate deeply into someone's lungs when broken or cut Most countries prohibited its use and enacted legislation to safely dispose at this material. Aside landfilling on specialized sites, inertization through smelting/vitrification techniques have been developed. Asbestos-containing wastes are smelted in crucibles or with plasma torch technology, then caged, cooled down and crushed. The resulting gravel being a non-hazardous waste, it is usually landfilled or used as road sub-base or filler. This material may include:
  aluminum oxide ($Al_2O_3$): from 2 to 10 wt. %,
  calcium oxide (CaO): from 25 to 50 wt. %,
  iron oxide ($Fe_2O_3$): from 0 to 5 wt. %,
  magnesium oxide (MgO): from 4 to 15 wt. %,
  silicon dioxide ($SiO_2$): from 35 to 55 wt. %,
  optionally one or more of the following: from 0.01 to 10 wt. %.
  MnO, $K_2O$, $Na_2O$, and $TiO_2$
and inevitable impurities, wherein the wt. % is the weight percent relative to the total weight of the asbestos inertization residues composition to provide, including the inevitable impurities. 100 wt. %. The inevitable impurities are, generally, unavoidable and are often a result of the process environment or feedstocks. Inevitable impurities may be present from 0.01 to 10.0 wt. % of the composition.

Rock dusts are mostly produced by the mining and quarrying industries, as a by-product of rock extraction, polishing or crushing. They are also widely available in the environment. Although they might be used as concrete filler or mad sub base material, increasing their use in higher added-value applications in the ceramic field could be beneficial. Their composition can vary widely depending on geographical location and the nature of the rocks presents and can contain various amount of oxides such as $Fe_2O_3$, $Al_2O_3$, etc. These materials may include:

- aluminum oxide ($Al_2O_3$): from 3 to 14 wt. %,
- calcium oxide (CaO): from 0.1 to 20 wt. %,
- iron oxide ($Fe_2O_3$): from 0.01 to 8 wt. %,
- magnesium oxide (MgO): from 0.01 to 6 wt. %,
- silicon dioxide ($SiO_2$): from 60 to 88 wt. %,
- sodium oxide ($N_2O$): from 0.01 to 3 wt. %,
- potassium oxide ($K_2O$): from 0.5 to 6 wt. %.
- optionally one or more of the following: from 0.01 to 10 wt. %.
- MnO, $P_2O_5$, Sox, and $TiO_2$ and inevitable impurities, wherein the wt. % is the weight percent relative to the total weight of the rock dusts, sand and tailings composition to provide, including the inevitable impurities, 100 wt. %. The inevitable impurities are, generally, unavoidable and are often a result of the process environment or feedstocks. Inevitable impurities may be present from 0.01 to 10.0 wt. % of the composition.

Sand is basically made of natural unconsolidated granular materials. Sand is composed of sand grains which range in size from 0.06 to 2 mm. Sand grains are either rock fragments, mineral particles, or oceanic materials in origin. They are widely available in the environment. The most common mineral in the sand is quartz-also known as silicon dioxide. Also, sand can be recycled sand. Recycled sand are materials derived from industry, construction, demolition and excavation activities which are reprocessed and/or re-used whenever possible. These materials may include:

- aluminum oxide ($Al_2O_3$): from 0.1 to 5 wt. %.
- calcium oxide (CaO): from 0.1 to 6 wt. %,
- iron oxide ($Fe_2O_3$): from 0.01 to 5 wt. %,
- Magnesium oxide (MgO): from 0.01 to 6 wt. %,
- silicon dioxide ($SiO_2$): from 75 to 99 wt. %,
- sodium oxide ($Na_2O$): from 0.01 to 3 wt. %,
- potassium oxide ($K_2O$): from 0.5 to 4 wt. %,
- optionally one or more of the following: from 0.01 to 10 wt. %.
- MnO, $P_2O_5$, SOx, and $TiO_2$ and inevitable impurities, wherein the wt. % is the weight percent relative to the total weight of the sand composition to provide, including the inevitable impurities, 100 wt. %. The inevitable impurities are, generally, unavoidable and are often a result of the process environment or feedstocks. Inevitable impurities may be present from 0.01 to 10.0 wt. % of the composition.

A fraction of a ceramic factory's production is damaged during firing, for a variety of reasons, and can therefore not be sold. It is common practice in some ceramic industries (especially the brick and tiles industry) to mill a portion of these discarded items and integrate the powder into their feedstock, as a de-greasing and reinforcing agent, substituting sand. However, this valorization pathway is not always sufficient or even possible, and fired ceramic materials are landfilled or used in low added-value applications (filler . . . ). Moreover, used ceramics are produced by heavy industries and the demolition sectors (damaged refractory bricks, broken tiles . . . ) and might be better used. All of these different materials will be thereafter regrouped under the general term "fired ceramic materials". Their chemical composition will be similar to the clays and clay-like materials, as these are the base materials used for the most part of ceramic production. Moreover, some ceramic products are polished to obtain specific surface and aesthetic properties, or rectified (cut). As ceramics are hard and durable materials, specialized machinery is used for these operations, under water and lubricant spraying. The mixture obtained is referred to as "polishing mud" or "polishing dust" depending on its water content, and is one of the disclosed invention's possible feedstock. Used ceramics may include but are not limited to: used structural or insulating refractory elements (acidic, alkaline or neutral ones), mechanical elements, cutting and polishing tools, building bricks, tiles and slabs, alimentary or technical porcelains, stoneware and earthenware.

Secondly, the disclosed construction and technical ceramics are produced based on: (1) URCM comprises about 40 to about 80 wt. % of the mixture weight, (2) Fired Ceramic Materials or Sand comprises about 10 to about 50 wt. % of the mixture weight, and (3) one feedstock comprises about 10 to about 50 wt. % of the mixture weight included in the following feedstocks list: MSWIBA, Glass Waste, Steelmaking dusts, Rock Dust, and Fired Ceramic Materials (if not selected as second powder). Some disclosed construction and technical ceramics are produced wherein an optional fourth feedstock comprises about 3 to about 40 wt. % of the mixture weight selected from the group consisting of: MSWIFA, Alumina Red Mud, Aluminum Dross, Steelmaking dusts, and Biomass Ash.

Pre-treatments, illustrated in flow chart of FIG. 1, is a general term regrouping process steps that are done prior to using the as-received feedstock, generally to make the material more compatible with the requirements of the transformation process (i.e.: mixing, shaping, firing a ceramic), or to make the material easier to handle, store, and transport.

The presence of metals into a ceramic raw material can be detrimental, as metals can be reactive at high temperatures (oxidation or reduction, as an example). Moreover, their thermal dilatation coefficient being generally higher than the other constituents of a ceramic matrix surrounding them (alumino-silicates), they tend to fracture the matrix or produce cavities in the hulk of a green body during firing. Hence, iron and steel recovery from the feedstock may be used as a preliminary step before combining with water to form at least one of (1) an extrudable paste and (2) a granulated mixture. Iron and steel recovery processes are widespread and rely on the generation of a strong magnetic current over a conveyor. Iron-rich particles will be attracted by the magnet, and be removed from the feedstock. This process is widely used on steel slags, MSWIBA, and household wastes.

Non-ferrous Metals recovery also generally relies on the generation of a strong, varying magnetic field, called Eddy Current or Foucault Current. Metals react differently to this magnetic field: ferrous metals are attracted to it, while non-ferrous metals (aluminum and copper) are repulsed. By exposing the feedstock (on a conveyor, for example) not only the metals can be extracted from it, but also sorted. This process is widely used in waste-sorting facilities, typically to recover aluminum cans and copper wires from household wastes.

The as received feedstocks, which exhibit a particle site (longest linear dimension) of 50 mm or less, are subjected to a milling or crushing process. Crushing destroys a material by overwhelming compressive force or mechanical shock, causing a material to transform from a granular material into a finer one. However, the crushed material will most often present itself with a strongly heterogeneous shape. One of the most common crushing devices is called a jaw crusher. It is commonly used by, the mineral industries (mining, quarrying, ceramic industries . . . ) to transform rocks into a workable gravel that can either be used as it is (ballast, filler, concrete rock agglomerate) or undergo further treatments such as milling. The particles feedstocks are preferably reduced to a powder size of 1 mm or less, wherein the size is the longest linear dimension of the powders. When using a commercial jaw crusher, the particles are preferably crushed for a period of time in the range of 0.2 hours to 4 hours including all values and ranges therein. After that, nulling processes are used to produce particles with more homogeneous shape and roundness. Milling, also called grinding, rely more on attrition than on shock or compression to reduce particle size. Mills also are more prevalent for reducing particles to a smaller size than crushers. Depending on the grinding media and operational parameters, they can produce millimetric, micrometric, and sub-micronic powders. Ball millers are commonly used to grind clinker in cement industries, mineral ore in mining industries, or to produce fine et homogeneous powders or slurries for the ceramic industries (in the latter case, it is common practice to mill the materials diluted in water, sometimes with dispersant additives). The particles are preferably reduced to a powder size of 300 µm of less, wherein the size is the longest linear dimension of the powders. When using a commercial ball mill, the particles are preferably milled for a period of time in the range of 0.2 hours to 4 hours including all values and ranges therein.

Sieving consist in passing a granular material through a sieve with a fixed mesh. The particles smaller than the sieve gap will pass through, while wider ones will be retained at the surface of the mesh. It is common practice to use sieves in series, to retain certain fractions of a granular material. The crushed or milled powder is then sieved to obtain a homogenous mixture with particles sizes between 10 µm to 2 mm, including all values and ranges therein. Preferably for the ceramic's feedstocks mixing, the powders are screened to a size in the range of 20 to 400 µm.

Aging is a process used to stabilize materials that are not ready to be used at a given time. For example, MSWIBA, when exiting the incineration chamber, can be rich in alkali oxides and hydroxides (i.e., $CaO$ and $Ca(OH)_2$), those species being reactive and potentially detrimental for a given valorization path Ageing, sometimes also called weathering, consists in exposing the material to the elements (air, rain, sun, etc.) for a given period of time between 4 to 20 weeks, including all values and range therein, in order to stabilize it through metal's oxidation, organic matter decay, and carbonation.

Thermal treatment is another way to prepare a material for valorization. It consists in heating the said material, generally under atmospheric conditions, and can pursue several goals: destroying organic matter through combustion, oxidizing metals, drying or deep-drying of the material (including pore water or crystal hydration water), removing hydroxyl groups (—OH), removing carbonates (—$CO_3$), and eventually removing sulfur compounds (S, —SOx). Such treatment can have a considerable influence on the material's behavior. The thermal treatment is operated between 100 to 1200° C., including all values and ranges therein. As an example, removing all moisture from a powder can vastly help mixing it with other dry powders, and improve the granulation behavior under sprayed water. Removing organic matter, sulfur and carbonates prevent them from venting during the ceramic sintering process, which can have a highly detrimental impact on properties (density, mechanical strength, surface, and aesthetic properties).

The disclosed ceramics are produced based on several materials and feedstocks formulation that need to be mixed together prior to shaping. The feedstocks present themselves either as loose, dry powders or agglomerates, as a paste, or as a slurry. Depending on their properties, they will be mixed using rotary drums, rotary plates, pug mills, or any kind of mixer appropriate to their properties, according to the mixing ratios chosen for a particular application of the final ceramic. Preferably, the finest powders will be added first into the mix. Added water, if any, should be added progressively into the mixture, preferably by spraying during mixing. The goal of this process step is to produce a homogeneous mixture that can then be used as the raw ceramic material in the shaping step.

Shaping method consists in forming the raw ceramic materials to obtain a final product. The disclosed ceramic materials can be formed using three different methods, depending on the type of application for the desired ceramic, as well as the nature of the raw ceramic material. At this stage, the term "raw ceramic material" designates a homogeneous mixture of powders or a paste formed of the several feedstocks chosen. The methods further related to three different methods of forming the final products: (i) extrusion, (ii) dry powder compaction process, and (iii) agglomeration.

Preferably, a multi-step method for the extrusion method, illustrated in flow chart of FIG. 2, is used to form a construction or technical ceramics described herein, the method embodying: (1) preparation the ceramic raw material to obtain a plastic paste, then (2) shaping by extrusion to obtain a solid allied green body, then (3) drying to remove the moisture content, and finally (4) firing at high temperature to get a ceramic product. This forming method is commonly used to process day-containing raw ceramic materials to produce building bricks, roof and floor tiles, decorative and protective claddings, as well as a variety of specialty ceramics.

The aforementioned ceramic raw materials present themselves as a mixture of powders or as a paste. The extrusion shaping method requiring a certain level of plasticity, adjusting the water content of the raw materials can be needed (this is especially relevant for day-rich formulations, as moisture greatly impacts clay's behavior). At this stage of the process, additives can also be added to the mix. The function of the additives might be to increase plasticity (i.e., plasticizers), reduce friction inside the extruder (i.e., lubricants and release agents) or modify the behavior of the green body during firing (i.e., fluxing agents). The different raw materials, water and additives can be mixed together using a variety of systems, including rotating drums and pugmills (with or without vacuum pump), preferably adding the finest-grained raw materials first, and adding water and additives progressively to avoid the formation of clusters. Usually, plastic pastes contain in the range of 10 wt. % to 30 wt. % water of the total weight of the formulation, and the combined additives (plasticizers, temporary binders and lubricants, dispersants, flocculants, anti-foaming agents, etc. . . . ) are present in an amount within a range from 0 wt. % to 10 wt. % of the total weight of the formulation. Mixing should proceed until a homogeneous paste with satisfying plasticity is obtained, which can range from 0.25 to 4 hours.

At this point, the plastic paste is ready for extrusion. The prepared plastic paste is fed into the extruder's hopper, and pushed through the extruder's cylinder with either a ram, an endless screw or two parallel screws. Preferably, the extruder will be equipped with a vacuum pump, as the air trapped into the paste could adversely affect the properties of the extruded green body. The rotation speed of the screw or ram speed are to be adjusted depending on the properties of the paste and the desired output rate, and the rotation speed is from 10 to 100 revolutions per min, including all values and ranges therein. Extruders can be equipped with a variety of auxiliary systems, including but not limited to spray outlets inside the cylinder to dispense lubricants and release agents, heating systems, cooling systems, pressure sensors, temperature sensors. The extruded green body exiting the die is then cut at the appropriate length.

After the extrusion, drying operation is done to the green body using purpose-built dryers, with monitored humidity. During the drying stage, in which the temperature is transitioned from room temperature (20 to 30° C.) to drying temperature in the range of 100° C. to 150° C., a relatively slow heating rate is used, the heating rate being in the range of 0.5 K/min to 5 K/min, and preferably at 2 K/min, including all values and ranges therein. The time of the drying stage is preferably between 12 to 72 hours, including all values and ranges therein, depending on the size of the green body and its moisture content. The purpose-built dryers could be closed or tunnel ovens.

After the drying, firing operation is performed to allow sintering temperature and obtain a ceramic product. A temperature program including a preheating stage and a firing stage is preferably used. During the preheating stage, in which the temperature is transitioned from room temperature (20 to 25° C.) or the drying temperature to preheating temperature, a heating rate is used, the heating rate being in the range of 0.5 K/min to 20 K/min, and preferably at 2 K/min, including all values and ranges therein. The time of the preheating stage is preferably between 0.25 to 4 hours, including all values and ranges therein. As the preheating temperature from about 100° C. to 900° C., the additives burn out if included in the preparation. The firing temperature is selected depending on the shape and the formulation, it will be comprised between 800 and 1400° C. More preferably, the firing temperature will be comprised between 1000 and 1300° C. The heating rate from the preheating temperature to firing stage is preferably in the range from 0.5 K/min to 20 K/min, including all values and ranges therein, and more preferably at 2 K/min. The firing time or hold time is in the range of 0.5 hours to 8 hours, including all values and ranges therein. After firing, the ceramic product is cooled to room temperature or handling temperature. The cooling rate is preferably in the range of 1 K/min to 40 K/min, including all range and value therein.

Various process parameters in the extrusion method may affect the properties of the final ceramic, such parameters might include the formulation, screw speed, de-airing, preheating temperature and duration, heating rate, firing temperature and duration, and product shape.

Preferably, a multi-step method for the dry powder compaction method, illustrated in flow chart of FIG. 3, is used to form a construction or technical ceramics described herein, the method embodying: (1) preparation of the ceramic raw material called granulation, then (2) pressing to obtain a solid called green compact, then (3) drying to remove the moisture content, and finally (4) firing at high temperature to get a ceramic product. This forming method is used to process raw ceramic materials to produce building bricks, roof and floor tiles, decorative and protective claddings, as well as a variety of technical ceramics. Contrary to the extrusion shaping method, the pressing method is less depending on plasticity, making it sometimes a preferable choice to shape raw ceramics materials with low clay content.

The aforementioned ceramics raw materials present themselves as a mixture of powders, as a paste or as a slurry. Although the pressing methods can be less demanding than the extrusion regarding plasticity and cohesion, adjusting the water content of the raw materials can be needed. At this stage of the process, additives can also be added to the mix. The function of the additives might be to increase plasticity (i.e., plasticizers) or cohesion between particles (temporary binders), reduce friction inside the pressing mold (i.e., lubricants and release agents) or modify the behavior of the green body during firing (i.e., fluxing agents). Preferably, the resulting mixture will have lower moisture than the ones prepared for extrusion. Although it might be possible to press the raw ceramic materials directly as a powder or a slightly moist powder, it can be useful to granulate the material, especially if it presents itself as a dry mixture of loose powders. Granulation can be done using different methods like spray-drying, or rotary plate or drum moisturizing (depending if the raw materials present themselves as a slurry or as a dry powder, respectively). The movement, as well as the change in moisture, cause particles to agglomerate to form small granules. These granules are easier to handle than loose dry powders, and often also react better when pressed to form cohesive green bodies. The size of the desired granules, the duration of the process and the water content needed vastly depends on the raw material's nature, the size of the desired green body and the desired properties for the final ceramic. Usually, granules contain in the range of 0 wt. % to 10 wt. % water of the total weight of the formulation, and the combined additives (plasticizers, temporary binders and lubricants, dispersants, flocculants, antifoaming agents . . . ) are present in an amount within a range from 0 wt. % to 10 wt. % of the total weight of the formulation. Mixing should proceed until homogeneous granules are obtained, which can range from 0.25 hours to 4 hours.

The pressing step consists in applying high pressure on the granules placed in a mold, which is in turn placed into a press. Two variant dry compaction process can be done to obtain a ceramic product: (i) cold pressing by three successive steps i.e., compaction at room temperature to obtain green bodies, then drying and firing process, and (ii) hot pressing in one step wherein the thermal treatment is combined with the pressing step. The pressing action can also be either uniaxial (i.e., the force is applied on a given direction) or isostatic (i.e., the force is applied on every direction). Preferably, the compressing pressure for the cold dry powder compaction falls in a range from 10 MPa to 300 MPa, including all values and range therein, and preferably 50 MPa to 160 MPa. Pressure should be preferentially applied at a steady rate, although it might be possible to hold pressure at low compaction pressure to allow eventual trapped air to vent out of the mold and allow the powder to reorganize. About the hot dry powder compaction, the compression pressure is in the range from 10 MPa to 300 MPa, including ail values and range therein. The sintering temperature is in the range from 600 to 1300° C. with a sintering time in the range from 0.5 hour to 5 hours, and a heating rate between 1 K/min to 15 K/min, including all values and ranges therein.

After the cold dry powder compaction, drying operation is done to the green body using purpose-built dryers, with monitored humidity. During the drying stage, in which the temperature is transitioned from room temperature (20 to 30° C.) to drying temperature in the range of 100° C. to 150° C., a relatively slow healing rate is used, the heating rate being in the range of 0.5 K/min to 5 K/min, and preferably at 2 K/min, including all values and ranges therein. The time of the drying stage is preferably between 12 to 72 hours, including all values and ranges therein, depending on the size of the green body and its moisture content. The purpose-built dryers could be closed or tunnel ovens.

After the drying, firing operation is done to allow sintering temperature and obtain a ceramic product. A temperature program including a preheating stage and a firing stage is preferably used. During the preheating stage, in which the temperature is transitioned from room temperature (20 to 25° C.) or the drying temperature to preheating temperature, a heating rate is used, the heating rate being in the range of 0.5 K/min to 60 K/min, and preferably at 2 K/min, including all values and ranges therein. The time of the preheating stage is preferably between 0.25 to 4 hours, including all values and ranges therein. As the preheating temperature from about 100° C. to 900° C., the additives burn out if included in the preparation. The firing temperature is selected depending on the shape and the formulation, it will be comprised between 800 and 1400° C. More preferably, tire firing temperature w ill be comprised between 1000 and 1300° C. The heating rate from the preheating temperature to firing stage is preferably in the range from 0.5 K/min to 60 K/min, including all values and ranges therein, and more preferably at 2 K/min. The firing time or hold time is in the range of 0.5 hours to 8 hours, including all values and ranges therein. After firing, the ceramic product is cooled to room temperature or handling temperature. The cooling rate is preferably in the range of 1 K/min to 40 K/min, including all range and value therein.

Various process parameters in the dry powder compaction method may affect the properties of the final ceramic, such parameters might include the formulation, compaction pressure, preheating temperature and duration, heating rate, firing temperature and duration, and product shape.

Preferably, a multi-step method for the agglomeration method, illustrated in flow chart of FIG. 4, is used to form a construction or technical ceramics described herein, the method embodying: (1) agglomeration of the ceramic raw material to obtain an uniform microsphere, then (2) drying to remove the moisture content, and finally (3) firing at high temperature to get a ceramic product. This forming method can be used to produce small spheroids using clay-rich mixtures or a mixture of a raw material, and a binder. Basically, it comprises the same operational steps as dry compaction, except for the pressing itself: the granules are directly dried and fired.

The aforementioned ceramics raw materials present themselves as a mixture of powders, as a paste or as a slurry. Although agglomeration is usually less demanding than extrusion and dry powder compaction regarding both plasticity and cohesion, adjusting the water content of the raw materials can be needed. At this stage of the process, additives can also be added to the mix. The function of the additives might be to increase cohesion between particles (temporary binders), or modify the behavior of the green body during firing (i.e., fluxing agents). The additives, including the binders, may be provided in an amount within a range from 0 wt. % to 40 wt. % of the total weight of the powder formulation, including all ranges and values therein.

The formulation powder is then agglomerated to obtain a green body. Agglomeration can be done using preferentially a rotary plate or rotary drum. Agglomeration process should proceed until homogeneous size of the desired agglomerates are obtained, which can range from 0.2 hours to 4 hours including ail values and ranges therein. The rotation speed is from 10 to 400 min$^{-1}$, including all values and ranges therein.

After the agglomeration, the green bodies are dried to remove the moisture content of the material. This step can be optional; it depends on the amount of binder and water. During the drying stage, in which the temperature is transitional from room temperature (20 to 30° C.) to drying temperature in the range of 100° C. to 400° C., a relatively slow heating rate is used, the heating rate being in the range of 0.5 K/min to 5 K/min, and preferably at 2 K/min, including all values and ranges therein. The time of the drying stage is preferably between 1 to 36 hours, including all values and ranges therein, depending on the size of the green body and its moisture content.

After the drying, firing operation is done to allow sintering temperature in order for the material to density and gain its strength, firing can be performed in a furnace, or rotary kiln, and preferably occurs in an atmospheric environment. Depending on the equipment, the granules are directly dried and tired. A temperature program including a preheating stage and a firing stage is preferably used. During the preheating stage, in which the temperature is transitioned from room temperature (20 to 25° C.) or the drying temperature to preheating temperature, a heating rate is used, the heating rate being in the range of 0.5 K/min to 20 K/min, and preferably at 2 K/min, including all values and ranges therein. The time of the preheating stage is preferably between 0.25 to 4 hours, including all values and ranges therein. As the preheating temperature from about 100° C. to 900° C., the additives burn out if included in the preparation. The Tiring temperature is selected depending on the shape and the formulation, it will be comprised between 800 and 1400° C. More preferably, the firing temperature will be comprised between 1000 and 1500° C. The heating rate from the preheating temperature to firing stage is preferably in the range from 0.5 K/min to 20 K/min, including all values and ranges therein, and more preferably at 2 K/min. The firing time or hold time is in the range of 0.5 hours to 8 hours, including ail values and ranges therein. After firing, the ceramic product is cooled to room temperature or handling temperature. The cooling rate is preferably in the range of 1 K/min to 40 K/min, including all range and value therein.

Various process parameters in the agglomeration method may affect the properties of the final ceramic, such parameters might include the formulation, agglomeration speed, preheating temperature and duration, heating rate, firing temperature and duration, and product shape.

Experimental Example #1

Dry Powder Compaction: MSWIBA (80 wt. %) and URCM (20 wt. %)

Municipal Solid Waste Incinerator Bottom Ash (MSWIBA) was collected as gravel between 0 mm to 40 mm and considered as post-treated gravel. Pre-treatment included: (1) crushing the raw MSWIBA from a range between 0 mm to 100 mm as coarse aggregate to a gravel using a jaw crusher with a range between 0 mm to 40 mm, then (2) magnetic removal of iron and steel, then (3) magnetic removal of non-ferrous metals and finally (4) aging during 4 months. The moisture content of this material was around 7 wt. %.

The MSWIBA was dried in an oven with forced air circulation at 120° C. during 12 hours, before being crushed, using a jaw crusher (Retsch BB 50) to obtain a powder in the range between 500 μm to 1 mm. The resulting powder was milled using a ball miller (Retsch PM 100) during 1 hour, and sieved using sieves and a sieve shaker. The final powder presented itself as a grey powder, with a particle distribution $d_{50}$ of 150 μm. The particle distribution $d_{50}$ (is the diameter at which 50% of a sample's mass is comprised of smaller particles.

An URCM (waste clay), produced as a washing mud in a quarry, was also collected after being treated by the producer. Treatments included decantation in a storage tank, filter-pressing and drying. It presented itself as a fine, homogeneous, cluster-free orange pow der, with a small residual water content inferior to 1 wt. %, with a $d_{50}$ of around 12 μm. Further milling was considered unnecessary, as the panicle size of the clay was smaller than the MSWIBA's by an order of magnitude, favoring capacity a Her mixing. This as-received powder was also dried 12 hours at 120° C.

The dry powders were mixed together according to this specific composition: 80 wt. % of MSWIBA and 20 wt. % of URCM. The powders were mixed together during 0.5 hour using a Turbula powder mixer.

The dry mixtures were then granulated using a rotary plate, under water spraying. The produced granules had a characteristic length in the range from 0.5 mm to 1.5 mm, and presented a moisture content of about 4 wt. %.

The granules were used to feed a rectangular mold (dimension: 100×50×10 mm), which was then pressed to form the green bodies. The applied pressure was 32 MPa using a uniaxial hydraulic press (Carver). Samples were ejected using a mechanical piston coming from the bottom of the mold. The pressed samples exhibited a satisfying behavior during pressing, with limited defects (layering, swelling, transversal rupture, etc) and did not require the addition of lubricants to be extracted properly.

The green bodies were dried in a forced-venting oven (Nabertherm oven) at 120° C. with a hold time of 12 hours. The dried green bodies were sintered in an electrically heated muffle furnace at the preheating and firing temperatures (Nabertherm muffle furnace). During the preheating stage, in, which the temperature is transitioned from room temperature (25° C.) to preheating temperature at 600° C. The heating rate was 4 K/min and the time of the preheating stage was 1 hour. After that, the firing temperature and the heating rate from the preheating stage were 1120° C. and 2 K/min, respectively. The firing time was 2 hours. Alter firing, the ceramic product is cooled to room temperature with a cooling rate of 2 K/min.

The relative densities and the maximal compressive strength until failure have been measured using Archimedes' method and a monitored uniaxial press. The final product containing 80 wt. % of MSWIBA and 20 wt. % of URCM exhibited an average relative density of 2160 kg/m$^3$, and an average compressive strength of 65 MPa.

Experimental Example #2

Extrusion: MSWIBA (70 wt. %) and URCM (30 wt. %)

Municipal Solid Waste Incinerator Bottom Ash (MSWIBA) was collected as gravel between 0 mm to 40 mm and considered as post-treated gravel. Pre-treatment included: (1) crushing the raw MSWIBA from a range between 0 mm to 100 mm as coarse aggregate to a gravel using a jaw crusher with a range between 0 mm to 40 mm, then (2) magnetic removal of iron and steel, then (3) magnetic removal of non-ferrous metals and finally (4) aging during 4 months. The moisture content of this material was around 7 wt. %.

The MSWIBA was dried in an oven with forced air circulation at 120° C. during 12 hours, before being crushed, using a jaw crusher (Retsch BB 50) to obtain a powder in the range between 500 μm to 1 mm. The resulting powder was milled using a ball miller (Retsch PM 100) during 1 hour, and sieved using sieves and a sieve shaker. The final powder presented itself as a grey powder, with a particle distribution $d_{50}$ of 150 μm. The particle distribution $d_{50}$ is the diameter at which 50% of a sample's mass is comprised of smaller particles.

An URCM (waste clay), produced as a washing mud in a quarry, was also collected after being treated by the producer. Treatments included decantation in a storage tank, filter-pressing and drying. It presented itself as a fine, homogeneous, cluster-free orange pow der, with a small residual water content inferior to 1 wt. %, with a $d_{50}$ of around 12 μm. Further milling was considered unnecessary, as the panicle size of the clay was smaller than the MSWIBA's by an order of magnitude, favoring compactly a Her mixing. This as-received powder was also dried 12 hours at 120° C.

The dry powders were mixed together according to this specific composition. 70 wt. % of MSWIBA and 30 wt. % of URCM. Water was added to form a plastic paste, by uniformly spraying the rotating mixture. To obtain a satisfying plastic paste, 0.4 dry wt. % of organic plasticizer was added in the preparation. The plastic paste was mixed during 0.75 hour using a rotary drum mixer. The moisture content obtained was 20 wt. %+/−3 wt. %.

The plastic pastes were de-aired, with a vacuum pump activated, into a two-stage single screw extruder equipped with a conical 40 mm wide circular opening. The plastic pastes were then extruded to form plain cylinders with a 40 mm diameter, and cut at 50 mm length.

The green bodies were dried in a forced-venting oven (Nabertherm oven) at 120° C. with a holding time of 12 hours. The dried green bodies were sintered in an electrically heated muffle furnace at the preheating and firing temperatures (Nabertherm muffle furnace). During the preheating stage, in which the temperature is transitioned from room temperature (25° C.) to preheating temperature at 600° C. The heating rate was 4 K/min and the time of the preheating stage was 1 hour. Alter that, the firing temperature and the heating rate from the preheating stage were 1120° C. and 2 K/min, respectively. The firing time was 2 hours. After firing, the ceramic product is cooled to room temperature with a cooling rate of 2 K/min.

The relative densities and the maximal compressive strength until failure have been measured using Archimedes' method and a monitored uniaxial press. The final product containing 70 wt. % of MSWIBA, 30 wt. % of URCM, and extruded with 0.4 dry wt. % of organic plasticizer, exhibited an average relative density of 1770 kg/m$^3$, and an average compressive strength of 57 MPa.

Experimental Example #3

Dry Powder Compaction; MSWIBA (70 wt. %), URCM (25 wt. %), and Fired Ceramic Materials (5 wt. %)

Municipal Solid Waste Incinerator Bottom Ash (MSWIBA) was collected as gravel between 0 mm to 40 mm and considered as post-treated gravel. Pre-treatment included; (1) crushing the raw MSWIBA from a range between 0 mm to 100 mm as coarse aggregate to a gravel using a jaw crusher with a range between 0 mm to 40 mm, then (2) magnetic removal of iron and steel, then (3) magnetic removal of non-ferrous metals and finally (4) aging during 4 months. The moisture content of this material was around 7 wt. %.

The MSWIBA was dried in an oven with forced air circulation at 120° C. during 12 hours, before being crushed, using a jaw crusher (Retsch BB 50) to obtain a powder in the range between 500 μm to 1 mm. The resulting powder was milled using a ball miller (Retsch PM 100) during 1 hour, and sieved using sieves and a sieve shaker. The final powder presented itself as a grey powder, with a particle distribution $d_{50}$ of 150 μm. The particle distribution $d_{50}$ is the diameter at which 50% of a sample's mass is comprised of smaller particles.

An URCM (waste clay), produced as a washing mud in a quarry, was also collected after being treated by the producer. Treatments included decantation in a storage tank, filter-pressing, and drying. It presented itself as a fine, homogeneous, cluster-free orange powder, with a small residual water content inferior to 1 wt. %, with a $d_{50}$ of around 12 μm. Further milling was considered unnecessary, as the panicle size of the clay was smaller than the MSWI-BA's by an order of magnitude, favoring compacity after mixing. This as-received powder was also dried 12 hours at 120° C.

A fired ceramic material (type stoneware) has been collected as production waste of a sanitary ceramic factory. The material was milled using a ball miller during 0.5 hour, and sieved using a set of sieves and a sieve shaker. The final powder presented itself as a white powder, with a particle distribution $d_{50}$ of 31 μm.

The dry powders were mixed together according to this specific composition: 70 wt. % of MSWIBA, 25 wt. % of URCM, and 5 wt. % of fired ceramic material. The powders were mixed together during 1 hour using a Turbula powder mixer.

The dry mixtures were then granulated using a rotary plate, under water spraying. The produced granules had a characteristic length in the range from 0.5 mm to 1.5 mm, and presented a moisture content of about 4 wt. %.

The granules were used to teed a rectangular mold (dimension: 100×50×10 mm), which was then pressed to form the green bodies. The applied pressure was 35 MPa using a uniaxial hydraulic press (Carver). Samples were ejected using a mechanical piston coming from the bottom of the mold. The pressed samples exhibited a satisfying behavior during pressing, with limited defects (layering, swelling, transversal rupture, etc.) and did not require the addition of lubricants to be extracted properly.

The green bodies were dried in a forced-venting oven (Nabertherm oven) at 120° C. with a holding time of 10 hours. The dried green bodies were sintered in an electrically heated muffle furnace at the preheating and firing temperatures (Nabertherm muffle furnace). During the preheating stage, in which the temperature is transitioned from room temperature (25° C.) to preheating temperature at 600° C. The heating rate was 4 K/min and the time of the preheating stage was 0.5 hour. After that, the firing temperature and the heating rate from the preheating stage were 1125° C. and 2 K/min, respectively. The firing time was 1 hour, After firing, the ceramic product is cooled to room temperature with a cooling rate of 2 K/min.

The relative densities and the maximal compressive strength until failure have been measured using Archimedes' method and a monitored uniaxial press. The final product containing 70 wt. % of MSWIBA, 25 wt. % of URCM, and 5 wt. % of fired ceramic materials, exhibited an average relative density of 2210 kg/m³, and an average compressive strength of 59 MPa.

Experimental Example #4

Dry Powder Compaction: MSWIBA (70 wt. %) URCM (20 wt. %), Fired Ceramic Materials (5 wt. %), and Sand (5 wt. %)

Municipal Solid Waste Incinerator Bottom Ash (MSWIBA) was collected as gravel between 0 mm to 40 mm and considered as post-treated gravel Pre-treatment included; (1) crushing the raw MSWIBA from a range between 0 mm to 100 mm as coarse aggregate to a gravel using a jaw crusher with a range between 0 mm to 40 mm, then (2) magnetic removal of iron and steel, then (3) magnetic removal of non-ferrous metals and finally (4) aging during 4 months. The moisture content of this material was around 7 wt. %.

The MSWIBA was dried in an oven with forced air circulation at 120° C. during 12 hours, before being crushed, using a jaw crusher (Retsch BB 50) to obtain a powder in the range between 500 μm to 1 mm. The resulting powder was milled using a ball miller (Retsch PM 100) during 1 hour, and sieved using sieves and a sieve shaker. The final powder presented itself as a grey powder, with a particle distribution $d_{50}$ of 150 μm. The particle distribution $d_{50}$ is the diameter at which 50% of a sample's mass is comprised of smaller particles.

An URCM (waste clay), produced as a washing mud in a quarry, was also collected after being treated by the producer. Treatments included decantation in a storage tank, filter-pressing and drying. It presented itself as a fine, homogeneous, cluster-free orange powder, with a small residual water content inferior to 1 wt. %, with a $d_{50}$ of around 12 μm. Further milling was considered unnecessary, as the particle size of the clay was smaller than the MSWI-BA's by an order of magnitude, favoring compacity after mixing. This as-received powder was also dried 12 hours at 120° C.

A fired ceramic material (type stoneware) has been collected as production waste of a sanitary ceramic factory. The material was milled using a ball miller during 0.5 hour, and sieved using sieves and a sieve shaker. The final powder presented itself as a white powder, with a particle distribution $d_{50}$ of 40 μm.

Sand has been collected, as a by-product of a clay quarrying company. It presents itself as a very fine, dry, homogeneous powder with a $d_{50}$ of 2.5 μm.

The dry powders were mixed together according to this specific composition: 70 wt. % of MSWIBA, 20 wt. % of URCM, 5 wt. % of fired ceramic material, and 5 wt. % of sand. The powders were mixed together during 1 hour using a Turbula powder mixer.

The dry mixtures were then granulated using a rotary plate, under water spraying. The produced granules had a characteristic length in the range from 0.5 mm to 1.5 mm, and presented a moisture content of about 4 wt. %.

The granules were used to feed a rectangular mold (dimension: 100×50×10 mm), which was then pressed to form the green bodies. The applied pressure was 35 MPa using a uniaxial hydraulic press (Carver). Samples were ejected using a mechanical piston coming from the bottom of the mold. The pressed samples exhibited a satisfying behavior during pressing, with limited defects (layering, swelling, transversal rupture, etc.) and did not require the addition of lubricants to be extracted properly.

The green bodies were dried in a forced-venting oven (Nabertherm oven) at 120° C. with a holding time of 10 hours. The dried green bodies were sintered in an electrically heated muffle furnace at the preheating and firing temperatures (Nabertherm muffle furnace). During the preheating stage, in which the temperature is transitioned from room temperature (25° C.) to preheating temperature at 600° C. The heating rate was 4 K/min and the time of the preheating stage was 0.5 hour. After that, the firing temperature and the heating rate from the preheating stage were 1125° C. and 2 K/min, respectively. The firing time was 1 hour. After bring, the ceramic product is cooled to room temperature with a cooling rate of 2 K/min.

The relative densities and the maximal compressive strength until failure have been measured using Archimedes' method and a monitored uniaxial press. The final product containing 70 wt. % of MS WI BA, 25 wt. % of URCM, 5 wt. % of fired ceramic materials, and dry 5 wt. % of sand, exhibited an average relative density of 2230 kg/m$^3$, and an average compressive strength of 71 MPa.

Experimental Example #5

Dry Powder Compaction: URCM (60 wt. %), Fired Ceramic Materials (20 wt. %), and Steel Making Dusts (20 wt. %)

An URCM (waste clay), produced as a washing mud in a ceramic factory, was also collected in a ceramic Effluent Treatment Plant (ETP). It presented itself as a thick, white mud constituted of fine particles, with a residual water content between 15 to 30 wt. %, with a d$_{50}$ of around 10 µm. Further milling was considered unnecessary. This as-received powder was also dried 24 hours at 120° C., and then de-agglomerated by friction.

A Fired Ceramic Material (polishing sludge), produced as a polishing mud in a ceramic factory, was also collected in a ceramic Effluent Treatment Plant (ETP). It presented itself as a fine, homogeneous, cluster-free white slurry, with a residual water content between 15 to 30 wt. %, with a d$_{50}$ of around 8 µm. Further milling was considered unnecessary. This as-received powder was also dried 24 hours at 120° C.

Steelmaking dusts (slag dusts), has been collected as a grey/black powder, fine homogeneous powder. The fraction passing a 250 µm sieve has been selected. The final powder was subjected to a heat treatment process at 1,000° C. for 2 hours.

The dry powders were mixed together according to this specific composition: 60 wt. % of URCM, 20 wt. % of tired ceramic material, and 20 wt. % of Steelmaking dusts. The powders were mixed together during 1 hour using a Turbula powder mixer.

The dry mixtures were then granulated using a rotary plate, under water spraying. The produced granules had a characteristic length in the range from 0.5 mm to 1 mm, and presented a moisture content of about 6 wt. %.

The granules were used to feed a cylindrical mold (diameter 25 mm), which was then pressed to form the green bodies. The applied pressure was 80 MPa using a uniaxial hydraulic press (Carver). Samples were ejected using a mechanical piston coming from the bottom of the mold. The pressed samples exhibited a satisfying behavior during pressing, with limited defects (layering, swelling, transversal rupture, etc.) and did not require the addition of lubricants to be extracted properly.

The green bodies were dried in a forced-venting oven (Nabertherm oven) at 120° C. with a holding time of 5 hours. The dried green bodies were sintered in an electrically heated muffle furnace at the preheating and firing temperatures (Nabertherm muffle furnace). During the preheating stage, in which the temperature is transitioned from room temperature (25° C.) to preheating temperature at 600° C. The heating rate was 2 K/min and the time of the preheating stage was 0.5 hour. After that, the firing temperature and the heating rate from the preheating stage were 1100° C. and 2 K/min, respectively. The firing time was 1 hour. After firing, the ceramic product is cooled to room temperature with a cooling rate of 2 K/min.

The relative densities have been measured using Archimedes' method. The final product containing 60 wt. % of URCM, 20 wt. % of fired ceramic material, and 20 wt. % of Steelmaking dusts, exhibited an average relative density of 2265 kg/m$^3$.

Experimental Example #6

Dry Powder Compaction: URCM (70 wt. %), Fired Ceramic Materials (10 wt. %), and Sand (20 wt. %)

An URCM (waste clay), produced as a washing mud in a ceramic factory, was also collected in a ceramic Effluent Treatment Plant (FTP). It presented itself as a thick, white mud constituted of fine particles, with a residual water content between 15 to 30 wt. %, with a d$_{50}$ of around 10 µm. Further milling was considered unnecessary. This as-received powder was also dried 24 hours at 120° C., and then de-agglomerated by friction.

A Fired Ceramic Material (polishing sludge), produced as a polishing mud in a ceramic factory, was also collected in a ceramic Effluent Treatment Plant (FTP). It presented itself as a fine, homogeneous, cluster-free white powder, with a residual water content between 15 to 30 wt. %, with a d$_{50}$ of around 8 µm. Further milling was considered unnecessary. This as-received powder was also dried 24 hours at 120° C.

Sand has been collected, as a by-product of a clay quarrying company. It presents itself as a very fine, dry, homogeneous powder with a d$_{50}$ of 2.5 µm.

The dry powders were mixed together according to this specific composition: 70 wt. % of URCM, 10 wt. % of fired ceramic material, and 20 wt. % of sand. The powders were mixed together during 1 hour using a Turbula powder mixer.

The dry mixtures were then granulated using a rotary plate, under water spraying. The produced granules had a characteristic length in the range from 0.5 mm to 1.5 mm, and presented a moisture content of about 6 wt. %.

The granules were used to feed a cylindrical mold (diameter: 25 mm), which was then pressed to form the green bodies. The applied pressure was 80 MPa using a uniaxial hydraulic press (Carver). Samples were ejected using a mechanical piston coming from the bottom of the mold. The pressed samples exhibited a satisfying behavior during pressing, with limited defects (layering, swelling, transversal rupture, etc.) and did not require the addition of lubricants to be extracted properly.

The green bodies were dried in a forced-venting oven (Nabertherm oven) at 120° C. with a holding time of 5 hours. The dried green bodies were sintered in an electrically heated muffle furnace at the preheating and firing temperatures (Nabertherm muffle furnace), During the preheating stage, in which the temperature is transitioned from room temperature (25° C.) to preheating, temperature at 600° C.

The heating rate was 2 and the time of the preheating stage was 0.5 hour. After that, the firing temperature and the heating rate from the preheating stage were 1100 and 2 K/min, respectively. The firing time was 1 hour. After firing, the ceramic product is cooled to room temperature with a cooling rate of 2

The relative densities have been measured using Archimedes' method. The final product containing 70 wt. % of URCM, 10 wt. of tired ceramic material, and 20 wt. % of sand, exhibited an average relative density of 2120 kg/m$^3$.

Experimental Example #7

Dry Powder Compaction: URCM (60 wt. %), Fired Ceramic Materials (10 wt. %), Steel Making Dusts (20 wt. %), and Sand (10 wt. %)

An URCM (waste clay), produced as a washing mud in a ceramic factory, was also collected in a ceramic Effluent Treatment Plant (FTP). It presented itself as a thick, white mud constituted of fine particles, with a residual water content between 15 to 30 wt. %, with a d$_{50}$ of around 10 µm. Further milling was considered unnecessary. This as-received powder was also dried 24 hours at 120° C., and then de-agglomerated by friction.

A Fired Ceramic Material (polishing sludge), produced as a polishing mud in a ceramic factory, was also collected in a ceramic Effluent Treatment Plant (ETP). It presented itself as a fine, homogeneous, cluster-free white powder, with a residual water content between 15 to 30 wt. %, with a d$_{50}$ of around 8 µm. Further milling was considered unnecessary. This as-received powder was also dried 24 hours at 120° C. Steelmaking dusts (slag dusts), has been collected as a grey/black powder, fine homogeneous powder. The fraction passing a 250 µm sieve has been selected. The final powder was subjected to a heat treatment process at 1,000° C. for 2 hours.

Sand has been collected, as a by-product of a day quarrying company. It presents itself as a very fine, dry, homogeneous powder with a d$_{50}$ of 2.5 µm.

The dry powders were mixed together according to this specific composition: URCM (60 wt. %), Fired Ceramic Materials (10 wt. %). Steelmaking dusts (20 wt. %), and Sand (10 wt. %). The powders were mixed together during 1 hour using a Turbula powder mixer.

The dry mixtures were then granulated using a rotary plate, under water spraying. The produced granules had a characteristic length in the range from 0.5 mm to 1.5 mm, and presented a moisture content of about 6 wt. %.

The granules were used to feed a cylindrical mold (diameter: 25 mm), which was then pressed to form the green bodies. The applied pressure was 80 MPa using a uniaxial hydraulic press (Carver). Samples were ejected using a mechanical piston coming from the bottom of the mold. The pressed samples exhibited a satisfying behavior during pressing, with limited defects (layering, swelling, transversal rupture, etc.) and did not require the addition of lubricants to be extracted properly.

The green bodies were dried in a forced-venting oven (Nabertherm oven) at 120° C. with a holding time of 5 hours. The dried green bodies were sintered in an electrically heated muffle furnace at the preheating and firing temperatures (Nabertherm muffle furnace). During the preheating stage, in which the temperature is transitioned from room temperature (25° C.) to preheating temperature at 600° C. The heating rate was 2 K/min and the time of the preheating stage was 0.5 hour. After that, the firing temperature and the heating rate from the preheating stage were 1120° C. and 2 K/min, respectively. The firing time was 1 hour. After firing, the ceramic product is cooled to room temperature with a cooling rate of 2 K/min.

The relative densities have been measured using Archimedes' method. The final product containing URCM (60 wt. %). Fired Ceramic Materials (10 wt. %), Steelmaking dusts (20 wt. %), and Sand (10 wt. %), exhibited an average relative density of 2130 kg/m$^3$.

Experimental Example #8

Dry Powder Compaction: URCM (60 wt. %), Sand (15 wt. %), and Glass Waste (25 wt. %)

An URCM (waste clay), produced as a washing mud in a ceramic factory, was also collected in a ceramic Effluent Treatment Plant (ETP). It presented itself as a thick, white mud constituted of line particles, with a residual water content between 15 to 30 wt. %, with a d$_{50}$ of around 10 µm. Further milling was considered unnecessary. This as-received powder was also dried 24 hours at 120° C., and then de-agglomerated by friction.

Sand has been collected, as a by-product of a clay quarrying company. It presents itself as a very fine, dry, homogeneous powder with a maximum size of 250 µm.

Glass waste has been crushed, washed and nulled to form an homogeneous powder, with a maximum size of 250 µm.

The dry powders were mixed together according to this specific composition: 60 wt. % of URCM, 15 wt. % of sand, and 25 wt. % of glass waste.

The dry mixtures have been mixed together in a ball null with water, and then spray-dried to form granules. The produced granules had a characteristic length in the range from 0.5 mm to 1 mm, and presented a moisture content of about 5 wt. %.

The granules were used to feed a rectangular mold (dimension: 100×50×5 mm), which was then pressed to form the green bodies. The applied pressure was 40 MPa using a uniaxial hydraulic press. Samples were ejected using a mechanical piston coming from the bottom of the mold. The pressed samples exhibited a satisfying behavior during pressing, with limited defects (layering, swelling, transversal rupture, etc.) and did not require the addition of lubricants to be extracted properly.

The green bodies have then be dried and tired in a tunnel oven. The maximum firing temperature was 1130° C., with a total firing duration, from cold to cold, of 45 minutes.

The final product is a smooth porcelain tile, exhibiting a compressive strength of 48 MPa, along with a water absorption of 0.4 wt. %

Experimental Example #9

Dry Powder Compaction: URCM (80 wt. %), Sand (10 wt. %), and Fired Ceramic Material (10 wt. %)

An URCM (waste clay), produced as a washing mud in a ceramic factory, was also collected in a ceramic Effluent Treatment Plant (ETP). It presented itself as a thick, white mud constituted of fine particles, with a residual water content between 15 to 30 wt. %, with a d$_{50}$ of around 10 µm. Further milling was considered unnecessary. This as-received powder was also dried 24 hours at 120° C., and then de-agglomerated by friction.

Sand has been collected, as a by-product of a clay quarrying company. It presents itself as a very line, dry, homogeneous powder with a maximum size of 250 μm.

A fired ceramic material (type refractory) has been collected as production waste of a refractory recycling factory. The powder presented itself as a very thin, homogeneous white powder, with a particle size below 180 μm.

The dry powders were mixed together according to this specific composition: 80 wt. % of URCM, 10 wt. % of sand, and 10 wt. % of fired ceramic material.

The dry mixtures have been mixed together in a ball mill with water, and then spray-dried to form granules. The produced granules had a characteristic length in the range from 0.5 mm to 1 mm, and presented a moisture content of about 5 wt. %.

The granules were used to feed a rectangular mold (dimension: 100×50×5 mm), which was then pressed to form the green bodies. The applied pressure was 40 MPa using a uniaxial hydraulic press. Samples were ejected using a mechanical piston coming from the bottom of the mold. The pressed samples exhibited a satisfying behavior during pressing, with limited defects (layering, swelling, transversal rupture, etc.) and did not require the addition of lubricants to be extracted properly The green bodies have then be dried and fired in a tunnel oven. The maximum firing temperature was 1225° C., with a total firing duration, from cold to cold, of 47 minutes.

The final product is a smooth porcelain tile, exhibiting a compressive strength of 54 MPa, along with a water absorption of 0.1 wt. %

Experimental Example #10

Dry Powder Compaction: URCM (55 wt. %), Sand (15 wt. %), Glass Waste (25 wt. %), and Steelmaking Dusts (5 wt. %)

An URCM (waste clay), produced as a washing mud in a ceramic factory, was also collected in a ceramic Effluent Treatment Plant (ETP). It presented itself as a thick, white mud constituted of fine particles, with a residual water content between 15 to 30 wt. %, with a $d_{50}$ of around 10 μm. Further milling was considered unnecessary. This as-received powder was also dried 24 hours at 120° C., and then de-agglomerated by friction.

Sand has been collected, as a by-product of a clay quarrying company. It presents itself as a very fine, dry, homogeneous powder with a maximum size of 250 μm.

Glass waste has been crushed, washed and nulled to form an homogeneous powder with a maximum size of 250 μm.

Steelmaking process wastes (EAF dust), has been collected as a dark-brown, fine homogeneous powder, with small lumps of debris inside. The fraction passing a 180 μm sieve has been selected.

The dry powders were mixed together according to this specific composition: 55 wt. % of URCM, 15 wt. % of sand, 25 wt. % of glass waste, and 5 wt. % of steelmaking process waste.

The dry mixtures have been mixed together in a ball mill with water, and then spray-dried to form granules. The produced granules had a characteristic length in the range from 0.5 mm to 1 mm, and presented a moisture content of about 5 wt. %.

The granules were used to feed a rectangular mold (dimension: 100×50×5 mm), which was then pressed to form the green bodies. The applied pressure was 40 MPa using a uniaxial hydraulic press. Samples were ejected using a mechanical piston coming from the bottom of the mold. The pressed samples exhibited a satisfying behavior during pressing, with limited defects (layering, swelling, transversal rupture, etc.) and did not require the addition of lubricants to be extracted properly The green bodies have then be dried and fired in a tunnel oven. The maximum firing temperature was 1130° C., with a total firing duration, from cold to cold, of 35 minutes.

The final product is a smooth porcelain tile, exhibiting an original brown color and a glassy surface. The compressive strength was 64 MPa, along with a water absorption of 0.5 wt. %

As would be appreciated by those of skill in the art, the methods described herein can be performed in various steps by various parties, and not all steps need to be performed in the same location Or by the same parties. For example, collecting and sorting feedstocks can be performed by parties other than the parties combining the first and second component materials with water to form at least one of (1) an extrudable paste and (2) a granulated mixture; and/or forming a green body from the at least one of (1) the extrudable paste after extrusion and (2) the granulated mixture. Similarly, pretreatment of the feedstock from at least one of (1) iron/steel recovery, (2) recovery of at least one non-ferrous material, (3) sieving, (4) crushing, (5) milling, (6) aging, and (7) thermal treatment, collecting and sorting feedstocks can be performed by parties other than the parties combining the first and second component materials with Water to form at least one of (1) an extrudable paste and (2) a granulated mixture; and/or forming a green body front the at least one of (1) the extrudable paste after extrusion and (2) the granulated mixture.

REFERENCES

The following references discussed and/or cited herein are incorporated by reference into this application as a portion of the application.

Appendino, P., Ferraris, M., Matekovits, I., & Salvo, M. (2004). Production of glass-ceramic bodies from the bottom ashes of municipal solid waste incinerators. *Journal of the European Ceramic Society*, 24(5), 803-810. https://doi.org/10.1016/S0955-2219(03)00264-4

Bethanis, S., Cheeseman, C. R., & Sollars, C. J. (2002). Properties and microstructure of sintered incinerator bottoms ash. *Ceramics International*, 28(8), 881-886, https://doi.org/10.1016/S0272-8842(02)00068-8

Cheng, T. W., Tu, C., Ko, M. S., & Ueng, T. H. (2011). Production of glass-ceramics from incinerator ash using lab scale and pilot-scale thermal plasma systems. *Ceramics international*, 37(7), 2437-2444. https://doi.org./10.1016/j.ceramint.2011.05.088

Lynn, C. J., Dhir OBE, R. K., & Ghataora, G. S. (2016). Municipal incinerated bottom ash characteristics and potential for use as aggregate in concrete. *Construction and Building Materials*, 127, 504-517. https://doi.org/10.1016/j.conbuitdmat.2016.09.132

Schabbach, L. M., Andreola, F., Barbieri, L., Lancellotti, I., Karamanova, E., Ranguelov, B., & Karamanov, A. (2012). Post-treated incinerator bottom ash as alternative raw material for ceramic manufacturing. *Journal of the European Ceramic Society*, 32(11), 2843-2852. https://doi.org/10.1016/j.jeurceramsoc.2012.01.020

Toraldo, E., Saponaro, S., Careghini, A., & Mariani, E. (2013). Use of stabilized bottom ash for bound layers of road pavements. *Journal of Environmental Management*, 121, 117-123. https://doi.org/10.1016/j.jenvman.2013.02.037

The invention claimed is:

1. A method of producing a ceramic product comprising:
receiving as a first component material a first feedstock;
receiving as a second component material a second feedstock;
combining the first and second component materials with water to form at least one of (1) an extrudable paste and (2) a granulated mixture;
forming a green body from the at least one of (1) the extrudable paste after extrusion and (2) the granulated mixture;
drying the green body;
firing the green body to form the ceramic product; and
cooling the ceramic product, wherein
the first component material is pretreated Municipal Solid Waste Incinerator Bottom Ash (MSWIBA);
the second component material is Unfired Raw Ceramic Material (URCM) powder; and
the MSWIBA, URCM powder, and water are substantially free of organic substances.

2. The method as claimed in claim 1, wherein the first component is at least 30% by weight of a mixture of the first and second components.

3. The method as claimed in claim 1, wherein the second component is at least 10% by weight of a mixture of the first and second components.

4. The method as claimed in claim 1, wherein the first component is 80% by weight of a mixture of the first and second components, and
wherein the second component is 20% by weight of the mixture of the first and second components.

5. The method as claimed in claim 1, wherein combining the first and second components further comprises combining a third component material to form the at least one of (1) the extrudable paste and (2) the granulated mixture, wherein the third component is selected from the group consisting of: Municipal Solid Waste Incinerator Fly Ash (MSWIFA), Glass Waste, Steelmaking dusts, Alumina Red Mud, Aluminum Dross, Biomass Ash, Asbestos-Containing Waste, Rock Dust, Sand, and Fired Ceramic Materials.

6. The method as claimed in claim 5, wherein the third component is at least 3% by weight of a mixture of the first, second, and third components.

7. The method as claimed in claim 5, wherein combining the first and second components further comprises combining the third component to form the at least one of (1) the extrudable paste and (2) the granulated mixture,
wherein the third component is fired ceramic, and
wherein the first, second and third components have relative weights of 70%, 25% and 5% respectively.

8. The method as claimed in claim 1, wherein combining the first and second components further comprises combining a third component and a fourth component to form the at least one of (1) the extrudable paste and (2) the granulated mixture, wherein the third component and the fourth component are selected from the group consisting of: Municipal Solid Waste Incinerator Fly Ash: (MSWIFA), Glass Waste, Steelmaking dusts, Alumina Red Mud, Aluminum Dross, Biomass Ash, Asbestos Containing Waste, Rock Dust, Sand, and Fired Ceramic Materials.

9. The method as claimed in claim 8, wherein the third and fourth components combined are at least 3% by weight of a mixture of the first, second, third, and fourth components.

10. The method as claimed in claim 8, wherein combining the first and second components further comprises combining the third component and the fourth component to form the at least one of (1) the extrudable paste and (2) the granulated mixture,
wherein the third component is fired ceramic,
wherein the fourth component is sand, and
wherein the first, second, third and fourth components have relative weights of 70%, 20%, 5%, and 5% respectively.

11. A method of producing a ceramic product comprising:
receiving as a first component material a first feedstock;
receiving as a second component material a second feedstock;
combining the first and second component materials with a third component material and water to form at least one of (1) an extrudable paste and (2) a granulated mixture;
forming a green body from the at least one of (1) the extrudable paste after extrusion and (2) the granulated mixture;
drying the green body;
firing the green body to form the ceramic product; and
cooling the ceramic product, wherein the first component material is Unfired Raw Ceramic Material (URCM) powder,
the second component material includes at least one of fired ceramic material powder and Sand, and
the third component includes at least one of Municipal Solid Waste Incinerator Bottom Ash (MSWIBA), Glass Waste, Steelmaking dusts, fired ceramic material (if not selected as the second component), and Rock Dust, and
the first component, second component, third component, and water are substantially free of organic substances.

12. The method as claimed in claim 11, wherein the first component is at least 40% by weight of a mixture of the first, second and third components.

13. The method as claimed in claim 11, wherein the second component is at least 10% by weight of a mixture of the first, second and third components.

14. The method as claimed in claim 11, wherein the second component is sand, and third component is glass waste, and
wherein the first, second and third components have relative weights of 60%, 15% and 25% respectively.

15. The method as claimed in claim 11, wherein the second component is sand, and the third component is Fired Ceramic Material, and
wherein the first, second and third components have relative weights of 80%, 10% and 10% respectively.

16. The method as claimed in claim 11, wherein combining the first, second, and third components further comprises combining a fourth component to form the at least one of (1) the extrudable paste and (2) the granulated mixture,
wherein the fourth component includes at least one of: Municipal Solid Waste Incinerator Fly Ash (MSWIFA), Alumina Red Mud, Aluminum Dross, Biomass Ash, and Steelmaking dusts.

17. The method as claimed in claim 16, wherein the fourth component has a relative weight of at least 3% with respect to the first through fourth components.

18. The method as claimed in claim 16, wherein the second component is sand, the third component is glass waste and the fourth component is Steelmaking dusts, and wherein the first, second, third, and fourth components have relative weights of 55%, 15%, 25% and 5% respectively.

\* \* \* \* \*